(12) United States Patent
Lenglet

(10) Patent No.: US 7,901,663 B2
(45) Date of Patent: Mar. 8, 2011

(54) PROCESS FOR CONVERTING BIOMASS TO PRODUCE SYNTHESIS GAS

(75) Inventor: Eric Lenglet, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 526 days.

(21) Appl. No.: 11/959,762

(22) Filed: Dec. 19, 2007

(65) Prior Publication Data
US 2008/0149896 A1 Jun. 26, 2008

(30) Foreign Application Priority Data
Dec. 20, 2006 (FR) ...................................... 06 11235

(51) Int. Cl.
*C01B 3/24* (2006.01)
*C01B 3/02* (2006.01)

(52) U.S. Cl. ...................................... 423/650; 423/648.1
(58) Field of Classification Search .................... 425/650
See application file for complete search history.

(56) References Cited

U.S. PATENT DOCUMENTS

| 2004/0123519 A1 | 7/2004 | Shigehisa et al. |
| 2005/0097814 A1 | 5/2005 | Sugita et al. |
| 2005/0256212 A1* | 11/2005 | Norbeck et al. ............. 518/702 |
| 2006/0123698 A1 | 6/2006 | Hunt |

FOREIGN PATENT DOCUMENTS

WO    WO 96/41070 A1    12/1996

* cited by examiner

*Primary Examiner* — Melvin C Mayes
*Assistant Examiner* — Kenneth Vaden
(74) *Attorney, Agent, or Firm* — Millen, White, Zelano & Branigan, P.C.

(57) ABSTRACT

The process of the invention concerns a series of steps for preparing a solid lignocellulosic biomass type feed to supply a unit for gasification of that feed.
The process employs at least one step for maturing the feed in the presence of a liquid hydrocarbon phase at a temperature in the range 250° C. to 320° C. for a residence time of at least 10 minutes, and milling the solid fragments which have thus been heat-treated in the presence of liquid hydrocarbon to obtain a suspension of solid in the divided form with a characteristic dimension of less than 150 micrometres.
The invention also concerns a device for carrying out the process.

14 Claims, 1 Drawing Sheet

PROCESS FOR CONVERTING BIOMASS TO PRODUCE SYNTHESIS GAS

FIELD OF THE INVENTION

Figure 1:
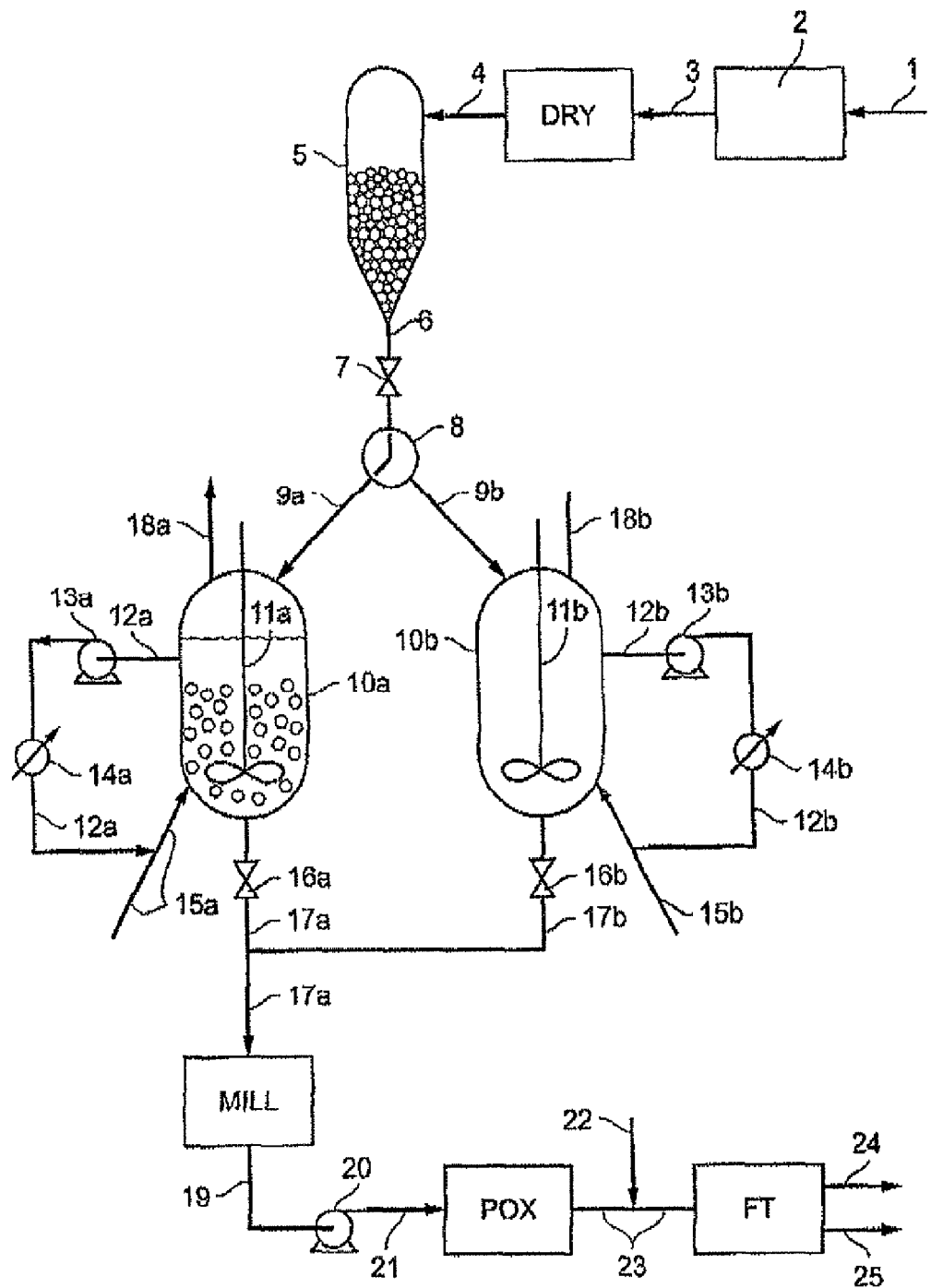

The invention relates to upgrading lignocellulosic biomass, in particular wood and vegetable waste, typically for the production of biofuels, and possibly for the production or co-production of liquid fuels and/or hydrogen or even of chemical products such as methanol.

More particularly, the present invention relates to a process for converting a feed containing lignocellulosic fibrous material, mixed with a hydrocarbon cut, for the production of a fine suspension of a solid which can supply a gasification unit for the production of synthesis gas.

By definition, synthesis gas is a mixture principally containing carbon monoxide and hydrogen (more than 50% molar for these two components, excluding $H_2O$, and normally more than 90% or even 99% molar of $CO+H_2$ in the dry gas). It may optionally also include a limited quantity of carbon dioxide if methanol is to be produced downstream.

Synthesis gas can, by chemical synthesis, produce liquid fractions such as hydrocarbon cuts, in particular a naphtha cut and a gas oil cut and/or olefinic fractions by means of the Fischer-Tropsch synthesis. It can also produce various chemical bases or alternative fuels, for example methanol or dimethylether.

By extension, the term "synthesis gas" as used in the invention encompasses a mixture comprising more than 50% molar of the hydrogen+oxide of carbon (excluding $H_2O$) mixture which is intended for the production of hydrogen or for energy applications such as a fuel for a gas turbine.

Thus, the present invention is not linked to a particular use of synthesis gas.

However, one of the most important applications of the present invention is in the chain of production of synthesized hydrocarbons by the Fischer-Tropsch reaction, in particular naphtha (petrochemical basis of hydrocarbons typically boiling below about 200° C.) and more particularly high quality gas oil.

In accordance with the invention, such high quality products may be produced by starting from a starting material at least in part constituted by lignocellulosic type biomass a typical example of which is wood chip. However, the invention may be implemented for any type of lignocellulosic biomass.

A few non-limiting examples of lignocellulosic biomass material are given below:
 residue from agricultural use (straw, sugar cane trash or any other type of ligneous residue, etc);
 forestry residues (products from thinning of forests);
 forestry products;
 sawmill residues;
 dedicated culture (for example short coppice rotation).

EXAMINATION OF PRIOR ART

The skilled person is aware of processes for thermolysis or pyrolysis of waste and/or for liquefaction of lignocellulosic biomass. Those processes operate at temperatures of over 250° C. and even up to 600° C. to obtain a residual solid and produce a thermolysis gas and usually at least one aqueous and/or organic liquid phase, frequently termed "bio-oil", i.e. oil of biological origin. The residence times used vary from one second to several minutes for rapid pyrolysis and may be from several minutes to one hour or more for slow pyrolysis or liquefaction. The process of the invention is more particularly applicable to thermolysis processes (or to pyrolysis processes, the two terms possibly being used independently) provided that the product obtained is more than 50% or even 90% by weight solid; it is mainly or essentially liquid in liquefaction processes.

Thermolysis techniques vary widely and may in particular use a fluidized bed of hot sand for direct or indirect contact.

The use of a screw or twin screw device with direct or indirect heating has also been proposed, for example using a hot fluidized sand bed. These techniques are relatively complex to implement.

The Assignee's French patent FR-A-2 678 850 describes a double jacket rotary pyrolysis furnace which is adapted to the treatment of domestic waste and which may include biomass.

The Assignee's unpublished patent application FR 06/07049 describes "torrefaction" of wood chips in a rotary double jacket furnace prior to being finely milled, typically to supply an entrained bed gasification unit.

That process describes using mild thermolysis or torrefaction which modifies the structure of the biomass so that the subsequent milling operations are facilitated. The pyrolysis furnace used is a double jacket rotary furnace; that technique is relatively difficult as regards implementation.

Thus, there remains a need for a technique for the heat-treatment of lignocellulosic biomass which is simple and reliable in its implementation.

Further, the skilled person is also aware of processes for carrying out optional supplemental steps of the invention, namely partial oxidation and also Fischer-Tropsch conversion.

The prior art describes the production of synthesis gas by partial oxidation of heavy carbonaceous material. Reference may in particular be made to the work "Le raffinage du pétrole, Procédés de transformation [Oil refining: Transformation processes], P Leprince, Editions Technip Paris, 1998, pages 492 to 509. This reference work also describes treatments for purification of synthesis gas upstream of the Fischer-Tropsch conversion, for example the Rectisol process for washing with cold methanol.

The Fischer-Tropsch conversion process may be carried out in a variety of manners using any known reactor or process using any known catalyst, in particular based on iron or cobalt. It is typically carried out with a catalyst adapted to the $H_2/CO$ ratio of the synthesis gas produced. As an example, it is typically possible to use a cobalt catalyst for a synthesis gas with a $H_2/CO$ ratio between about 1.8 and 2.5 or an iron catalyst for a synthesis gas with a $H_2/CO$ ratio which, for example, is between about 1.2 and 2; the values given are not limiting.

In the Fischer-Tropsch reactor, it is possible to use a three-phase fixed bed reactor or slurry reactor, i.e. a three-phase reactor with a liquid phase comprising a solid catalyst particulates in suspension and a gas phase (in this case, the synthesis gas, a mixture of $H_2$ and CO). The Fischer-Tropsch catalyst may be used in the form of fine particles in suspension comprising an inert support impregnated with iron or cobalt. As an example, an alumina or silica or zirconia or silica-alumina or alumina-zirconia support may be used, impregnated with 10% to 30% by weight of iron or cobalt with respect to the overall catalyst. The three-phase mixture may include particles of catalyst with a mean diameter in the range of 3 to 150 micrometres, preferably 10 to 120 micrometres, in suspension in a liquid essentially composed of reaction products, in particular paraffin waxes which are molten at the reaction temperature. The percentage by weight of catalyst may in general be between 10% and 40% by weight with respect to the liquid suspension/solid catalyst. The superficial gas velocity in the reactor may be in the range of 0.05 m/s to 0.4 m/s, in particular in the range of 0.12 to 0.3 m/s. The pressure is usually in the range of 1.5 to 4 MPa, in particular in the range of 1.8 to 2.8 MPa. The temperature is usually in the range of 215° C. to 255° C., generally in the range of 230° C. to 240° C. More details concerning catalysts and/or Fischer-Tropsch processes may be obtained from the following patents or patent applications: EP-A-0 450 860; U.S. Pat. No. 5,961,933; U.S. Pat. No. 6,060,524; U.S. Pat. No. 6,921,778; PCT/FR/05/02863.

Fischer-Tropsch conversion can thus transform the major part of the synthesis gas into liquid fractions.

Thus, typically, the Fischer-Tropsch effluents are treated to convert them into commercial end products: liquefied petroleum gas, naphtha, kerosene and a major quantity of gas oil with a high cetane number. To this end, in addition to the fractionation necessary for the effluents, isomerizing hydrocracking, HDKI, is typically carried out on the waxes (long-chain paraffins which are solid at ambient temperature) and also frequently on the fractions boiling above 150° C. to 200° C., the lightest fractions being hydroisomerized and not cracked.

BRIEF DESCRIPTION OF THE INVENTION

The present invention concerns a process for the transformation of heavy carbonaceous material comprising lignocellulosic biomass, in particular to convert it into synthesis gas by gasification. A treatment is carried out in at least 2 steps, the first being maturing the biomass in the form of coarse fragments mixed with at least one organic liquid, and the second being finely milling the biomass in the presence of a liquid (typically a hydrocarbon cut, optionally with solid particles in suspension) to form a suspension of particles with a very small characteristic dimension.

The maturation step is carried out at a temperature in the range 250° C. to 320° C. for a residence time of at least 10 minutes, to obtain a mixture of solid heat-treated fragments mixed in a liquid, and usually a gas which is released during the maturation step. The quantity of gas varies widely as a function of the starting biomass but is always minor and usually small. There may also occasionally be partial, generally low or zero, transformation of the solid phase into one or more liquid phases (bio oil).

It has been discovered that this liquid phase maturation step (the chips or fragments of biomass being dispersed in the liquid phase) results in rendering the fragments brittle after maturation, rendering their subsequent milling very easy, to form a suspension of very small particles. The fine milling step is considerably facilitated by the maturation step which can reduce the energy consumption by at least 60% compared with milling without prior maturation.

The concatenation of mild maturation of coarse fragments in the liquid phase then fine milling of the fragments which have been rendered brittle by maturation allows a suspension which is suitable for supplying to a gasification unit to be prepared in a particularly simple and reliable manner.

The present invention also concerns a device for carrying out the process cited above.

DETAILED DESCRIPTION OF THE INVENTION

The invention thus proposes a process for transforming heavy carbonaceous material comprising lignocellulosic biomass, in which:
a) a stream of biomass in the form of initial solid fragments with a characteristic dimension in the range 1 to 20 mm is introduced into a liquid L1 comprising more than 60% by weight of carbon and hydrogen to obtain a polyphase mixture comprising at least one liquid/solid mixture;
b) said liquid/solid mixture undergoes a maturation step at a temperature in the range 250° C. to 320° C. for a residence time of at least 10 minutes, to obtain a mixture of solid heat-treated fragments in a liquid L2, and optionally a gas G2;
c) said solid heat-treated fragments mixed with at least a fraction of L2 are milled to obtain a suspension of solid in the divided form with a characteristic dimension of less than 150 micrometres;
d) at least a fraction of said solid suspension in the divided form undergoes partial entrained bed oxidation POX to produce a synthesis gas SG.

The liquid L1 into which the biomass is introduced is typically a liquid hydrocarbon (this term does not exclude the presence of heteroatoms, for example oxygen, nitrogen, etc, such as a liquid obtained from biomass) and in general a heavy liquid hydrocarbon. It preferably includes one of the following cuts or a mixture formed from one of said cuts:
a vacuum residue from oil;
a fraction boiling above 200° C. deriving from a catalytic cracking unit (typically a vacuum distillate or an atmospheric residue), in particular an aromatic fraction termed LCO (light cycle oil) or HCO (heavy cycle oil);
a fraction of L2 comprising a liquid derived from any partial liquefaction of the biomass during step b).

The starting polyphase mixture (before maturation) may also optionally include particles of coke and/or coal and/or a recycle stream of the suspension of solid in the divided form obtained in step c).

The suspension which subsequently undergoes gasification may thus be completely gasified. In addition to the divided solid obtained, the liquid of the suspension is also gasifiable and there is no water to be evaporated, resulting in limited energy consumption.

The liquid L2 is typically the liquid obtained after maturation and includes liquid products which may be derived from the maturation treatment. It may be substantially identical to the initial liquid L1, in particular if L1 is a recycled fraction of L2, or if only a small amount of conversion of the biomass into liquid products has occurred, which depends on the biomass used and the operating conditions. This conversion into liquids is typically less than 50% by weight, often less than 20% by weight, and usually less than 10% by weight.

In general, the maturation step is not carried out on unrefined vegetable fragments, for example green wood, but before step a) for introducing the biomass in the form of initial solid fragments into the liquid L1, the following steps are carried out:
a step for preliminary milling or shredding of the biomass into initial fragments with a characteristic dimension in the range 1 to 20 mm; then
a step for preliminary drying of said initial fragments carried out at a temperature which is generally less than 250° C.

Drying can eliminate upstream the major portion of the water contained in the biomass, said water elimination also resulting in an improvement in performance due to limited energy consumption.

Maturation step b) may be carried out with a residence time which is typically between 10 and 40 minutes in the temperature range of 250° C. to 320° C. This can produce partial disaggregation of the lignocellulose, rendering the solid fragments fragile following maturation. Subsequent fine milling (typically 100 micrometres or less) is thus greatly facilitated.

Preferably, maturation step b) is carried out at a temperature in the range of 270° C. to 300° C. with a residence time in the range of 15 to 30 minutes. The pressure used is typically moderate, for example in the range of 0.1 to 1 MPa.

Heating the feed, which is necessary in maturation step b), and the maturation step per se may be carried out in various manners. In particular, the liquid/solid mixture may be circulated in a heated coil. In a preferred characteristic variation of the invention, maturation may also be carried out in at least one vessel comprising a mechanical agitator to stir the liquid/solid mixture.

In a preferred implementation, step b) is carried out in at least one vessel heated by closed loop circulation of a principally liquid stream removed from the volume, heated externally then re-introduced into said vessel. This means that a principally liquid stream is heated, which is easier to carry out than heating the whole liquid/solid mixture. The liquid may be collected from the upper portion of the vessel and/or coarse filtration may be carried out to prevent large chips from being entrained. Typically, said principally liquid stream is removed from a sufficiently high level in said vessel for the polyphase mixture at that level to be substantially free of solid fragments with a dimension of more than 5 mm.

Preferably, at least 2 and for example 2 to 4 volumes vessels are alternately supplied in a discontinuous manner to ensure a substantially uniform maturation time for all of the initial solid fragments of biomass. It is also possible to supply a predefined quantity of liquid to the first vessel, then an equally predetermined quantity of chips (dried initial fragments) under conditions which allow stirring, for example using a rotary mechanical agitator. Typically, the liquid/solid mixture is heated to the required maturation temperature by external circulation of a principally liquid stream which is heated externally of the first vessel. Circulation may optionally be interrupted after attaining the desired temperature and the liquid/solid mixture is maintained substantially at that temperature for the desired maturation period.

Alternatively, the mixture may continue to be heated and for example, maturation may be carried out with an increasing temperature profile. After maturation, the mixture is evacuated from the first vessel.

In another embodiment, liquid L1 may be pre-heated before introducing the initial biomass fragments, typically to a temperature which is higher than the maturation temperature, to obtain the desired temperature of the mixture after introducing the biomass. This temperature is slightly higher than the final maturation temperature, to take into account the slight endothermicity of the reactions occurring during the maturation step, and heat losses. In this embodiment of the invention, it is no longer necessary to heat a liquid which has been in contact with biomass.

The use of several sequentially supplied maturation vessels renders the process more continuous or even continuous as regards supply of biomass.

During the maturation phase in the first vessel, the second vessel may be supplied in an analogous manner, or several other vessels in sequence. Thus, continuous or semi-continuous supply of dry chips to the maturation vessels is achieved.

According to another embodiment, it has been discovered that it is advantageous to strip the liquid/solid mixture during maturation using a gas, for example nitrogen, in an open loop or in a closed loop with condensation of the recovered vapour and recycling, to obtain complementary drying of the heat-treated solid fragments and preferably to obtain a residual water content in said fragments of less than 5% by weight. This saves energy on partial oxidation which is typically carried out downstream, by reducing the oxygen requirement (less water to be evaporated).

At the outlet from maturation step b), in step c) the residual solids mixed with at least a fraction of L2 is milled to obtain a suspension of residual solids in the divided form with a characteristic dimension which is typically below 100 micrometres generally comprising 30% to 75%, and typically 40% to 70% by weight of solid particles. This step is easy to carry out because the solids obtained have been made brittle by maturation.

Then, typically, a partial oxidation step POX is carried out with oxygen in a step d) at a temperature which is usually in the range of 1250° C. to 1400° C. The synthesis gas SG obtained, after purification using conventional processes and optional addition of hydrogen to adapt the $H_2/CO$ ratio to the desired value, is typically converted into hydrocarbons in a subsequent step e) for conversion by the Fischer-Tropsch reaction.

It is also possible to convert only a portion of the SG into hydrocarbons and use the complementary fraction of SG to produce hydrogen; said hydrogen may then be added to the SG fraction converted into hydrocarbons to adjust the $H_2/CO$ ratio and/or to provide the hydrogen necessary for a hydrocracking step isomerizing heavy hydrocarbons (waxes) obtained during step e).

The invention also concerns a device for carrying out the process cited above, comprising:
- a means for supplying heavy carbonaceous material comprising lignocellulosic biomass to a means for milling or shredding said biomass into the form of initial solid fragments with a characteristic dimension in the range of 1 to 20 mm, connected to:
- a means DRY for at least partially drying said initial solid fragments, connected to:
- a means for introducing at least part of said dried initial solid fragments into a storage reservoir, connected via a three-way diverter valve to two maturation vessels;
- means for introducing a liquid L1 comprising more than 60% by weight of carbon and hydrogen into each of said volumes vessels;
- means for mixing L1 with at least part of said dried initial solid fragments to obtain a polyphase mixture comprising at least one liquid/solid mixture;
- for each of the maturation vessels, means for closed loop circulation of a principally liquid stream removed from the vessels, for heating externally by heating means, then for re-introduction into said vessels, to maintain the liquid/solid mixture at a temperature in the range of 250° C. to 320° C. for a residence time of at least 10 minutes, to obtain a mixture of heat-treated solid fragments in the liquid L2 and optionally a gas G2;
- means MILL for milling the heat-treated solid fragments mixed with at least a fraction of L2 to obtain a suspension of solid in the divided form with a characteristic dimension of less than 150 micrometres; and
- entrained bed means POX for partial oxidation of at least a fraction of said suspension of solid in the divided form to produce a synthesis gas SG.

DESCRIPTION OF THE FIGURE AND BEST MODE OF CARRYING OUT THE INVENTION

The invention will be better understood from the following description which describes the function of a facility for carrying out the process of the invention using a preferred embodiment diagrammatically represented in the accompanying single FIG. 1. Biomass, for example wood, is supplied via a line 1 for milling or coarse shredding in a unit 2. Various techniques for size reduction may be used, for example sawing, blade milling, shredding etc, to obtain a mean dimension of the fragments (wood chips, for example) in the range 1 to 20 mm, preferably in the range 4 to 15 mm. By definition, the characteristic dimension is the size of spheres of the same material having the same surface/volume ratio as the divided material being considered. The initial fragments or chips are then routed via a line 3 to a hot air convection drying unit DRY, typically using air heated to 150° C. to 200° C., then routed via a line 4 to a storage silo 5. Any known type of means for transporting biomass fragments may be used (for example a belt conveyor, screw conveyor, vibrating elevator, pneumatic transporter, etc). Similarly, any known type of dryer may be used, for example a screen dryer, a rotary oven, a cyclone dryer, etc. The chips stored in silo 5 typically have a water content in the range of 6% to 20% by weight, usually between 8% to 15% by weight, for example 10% by weight.

The chips (initial fragments) are evacuated via a line 6 comprising a valve 7, then supplied via a diverter valve 8 to one or other of the vessels 10A or 10B. FIG. 1 shows the configuration in which the chips are sent to the vessel 10A via a line 9A. The vessel 10A is provided with a line 15A for supplying a liquid L1, for example a heavy aromatic cut, an agitator 11A and a recirculation loop 12A comprising a recirculation pump 13A and a heat exchanger 14A.

The vessel 10A is sequentially supplied with chips and functions as follows: the vessel has already been supplied with a volume of liquid L1 sufficient to contain a predetermined quantity of chips to be supplied subsequently. L1 is, for example, a vacuum residue or a heavy catalytic cracking cut, termed "HCO" (heavy cycle oil). L1 is preferably supplied at a temperature corresponding to the desired maturation temperature, for example 300° C. Then, a predetermined quantity of chips is introduced by opening the valve 7 and orientating the diverter valve 8 towards the vessel 10A. The skilled person can readily use conventional means to ensure transfer of the chips in adequate quantities, such as an extraction screw, gravity feed means from the silo 5, or for marking the liquid level in the vessel 10A, an increase in this level being directly linked to the volume of chips introduced. Said chip introduction is carried out with mechanical agitation of the liquid/solid mixture: L1/chips, to ensure dispersion of the chips and prevent blockages. Then, recirculation of the liquid L1 is commenced via the recirculation loop 12A. The point for removing the recirculated liquid is located at a level sufficiently high in the vessel so that the liquid L1 is substantially free of coarse chips with a dimension of more than 5 mm at this level, to avoid the risk of blockages in the recirculation line. A filter may also be installed at this level. The recirculation loop can re-heat the liquid L1, which has been partially cooled by introducing the chips, to the desired temperature for the desired maturation, for example to 300° C. at a pressure of 0.1 to 0.2 MPa. The chips, mixed with L1, are then kept for the desired maturation period, for example 20 minutes, then evacuated from the vessel mixed with the liquid via a line 17A and the valve 16A. It is also possible to use conventional means for facilitating transfer of the mixture, for example an extraction screw, etc. At the end of the maturation treatment, depending on the biomass used, the liquid L2 may be substantially identical to liquid L1 or modified due to incorporation of an oil fraction produced by partial conversion of the biomass during the maturation treatment. This latter possibility occurs in particular if the biomass comprises green products which are degraded more easily.

The biomass maturation step per se also generates compounds which are partially or all located in the gas stream which is extracted from the vessel via a line 18A, comprising water, carbon dioxide, carbon monoxide and a large variety of organic oxygen-containing compounds (such as methanol, formic acid, lactic acid, furfural, hydroxyacetone).

During the maturation phase, it is also possible to introduce a stripping gas via a line 15A, for example nitrogen, to carry out complementary drying of the heat-treated chips. In this case, the stripping gas is also evacuated via line 15A.

It has been discovered that said complementary drying increases the chemical reactivity of the biomass in the downstream gasification and reduces the necessary quantity of oxygen.

The facility of FIG. 1 also comprises another maturation vessel 10B provided with the same elements as seen in vessel 10A, but with the index B, i.e. 11B, 12B, 13B, 14B, 15B, 16B, 17B, 18B. Maturation vessel 10B operates in a manner which is offset with respect to that of vessel 10A. As an example, it may be in the maturation phase when 10A is in the charging phase. Supply of chips from the storage silo 5 is discontinuous: either towards the vessel 10A or towards the vessel 10B, or supply is interrupted.

The (liquid L2/heat-treated chips) mixture from vessels 10A and 10B is sent to a milling unit MILL to obtain a fine suspension of carbonaceous particles with a characteristic dimension of less than 100 micrometres, for example about 50 micrometres. This final fine milling is readily obtained because of the partial disaggregation of the compounds of lignin and of cellulose. It may be carried out in different types of mills: a ball mill, blade mill, etc.

Excess liquid L2 is optionally evacuated before milling, for example from volumes vessels 10A and 10B, for example via lines 15A, 15B, to obtain the desired solids content in the fine suspension from the mill. This suspension is evacuated via the line 19, pumped via a pump 20 then supplied via a line 21 to a unit POX for entrained bed oxygen gasification. The suspension is steam atomized in a burner supplied with a stream of oxygen supplemented with steam and is typically gasified at a temperature of 1400° C. at a pressure of 2 MPa.

After purification, residual water and $CO_2$ are eliminated, for example by washing with a solution of ethanolamines and/or washing with methanol at low temperature, to obtain a synthesis gas SG which is sent via a line 23 to a Fischer-Tropsch conversion unit FT. The Fischer-Tropsch effluents are then recovered for the production, after hydroisomerization and hydrocracking of heavy fractions, typically of a small quantity of naphtha evacuated via a line 24 and a principal stream of gas oil with a high cetane number evacuated via a line 25. Before supplying it to the FT unit, the synthesis gas is optionally supplemented with a stream of hydrogen or a gas which is rich in hydrogen with a $H_2/CO$ ratio of more than 3, supplied via a line 22, to adjust the $H_2/CO$ ratio of the synthesis gas to that necessary for the Fischer-Tropsch reaction. This ratio may, for example, be close to 2.1 if a cobalt catalyst is used.

By dint of a very simple, reliable implementation, the invention allows lignocellulosic biomass to be prepared to allow it to be converted into biofuels, in particular high quality gas oil.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/11.235, filed Dec. 20, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for transforming heavy carbonaceous material comprising lignocellulosic biomass, said process comprising the following steps:
   a) a stream of said biomass in the form of initial solid fragments with a characteristic dimension in the range of 1 to 20 mm is introduced into a liquid L1 comprising more than 60% by weight of carbon and hydrogen to obtain a polyphase mixture comprising at least one liquid/solid mixture;
   b) said liquid/solid mixture undergoes a maturation step at a temperature in the range 250° C. to 320° C. for a residence time of at least 10 minutes, to obtain a mixture of solid heat-treated fragments in a liquid L2, and optionally a gas G2;
   c) said solid heat-treated fragments mixed with at least a fraction of liquid L2 are milled to obtain a suspension of solids having a characteristic dimension of less than 150 micrometres;
   d) at least a fraction of said suspension of solids undergoes partial entrained bed oxidation (PDX) to produce a synthesis gas (SG).

2. A process according to claim 1, wherein L1 comprises one of the following cuts or a mixture formed from one of said cuts:
   a vacuum residue from oil;
   a fraction boiling above 200° C. deriving from a catalytic cracking unit;
   a fraction of L2 comprising a liquid derived from partial liquefaction of the biomass during step b);
said polyphase mixture optionally further including particles of coke and/or coal and/or a recycle stream of said suspension of solids.

3. A process according to claim 1, further comprising at least the following steps before step a) for introducing said biomass in the form of initial solid fragments into the liquid L1:
   a step for preliminary milling or shredding of said biomass into initial fragments with a characteristic dimension in the range of 1 to 20 mm; then
   a step for preliminary drying of said initial fragments carried out at a temperature below 250° C.

4. A process according to claim 1, wherein maturation step b) is carried out with a residence time in the range of 10 to 40 minutes.

5. A process according to claim 4, wherein maturation step b) is carried out at a temperature in the range of 270° C. to 300° C. with a residence time in the range of 15 to 30 minutes.

6. A process according to claim 1, wherein maturation step b) is carried out in at least one vessel comprising a mechanical agitator to stir said liquid/solid mixture.

7. A process according to claim 1, wherein step b) is carried out in at least one vessel heated by closed loop circulation of a principally liquid stream removed from the vessel, heated externally then re-introduced into said vessel.

8. A process according to claim 7, wherein said principally liquid stream is removed from a sufficiently high level in said vessel for the polyphase mixture at that level to be substantially free of solid fragments with a dimension of more than 5 mm.

9. A process according to claim 6, wherein at least two vessels are used which are supplied alternately, in a discontinuous manner to provide a substantially uniform maturation time for all initial solid fragments of biomass.

10. A process according to claim 1, wherein said liquid/solid mixture is stripped during maturation with a gas which is other than steam to obtain complementary drying of the heat-treated solid fragments.

11. A process according to claim 1, wherein in step c) the solids mixed with at least a fraction of L2 is milled to obtain a suspension of solids with a characteristic dimension below 100 micrometres and comprising 40% to 70% by weight of said solids.

12. A process according to claim 1, wherein step d) for partial oxidation (PDX) using oxygen is carried out at a temperature in the range of 1250° C. to 1400° C.

13. A process according to claim 1, wherein a subsequent step e) is carried out for converting at least a portion of the synthesis gas (SG) into hydrocarbons by a Fischer-Tropsch reaction.

14. A Process according to claim 10 wherein the resultant residual water content in the dried heat-treated solid fragments is less than 5% by weight.

* * * * *